Sept. 9, 1958 J. A. MARABLE 2,850,949
INTERNAL SKIN AND CORE CUTTER FOR METALITE SURFACES
Filed April 29, 1954

INVENTOR
JESSE A. MARABLE

BY
ATTORNEYS

United States Patent Office 2,850,949
Patented Sept. 9, 1958

2,850,949

INTERNAL SKIN AND CORE CUTTER FOR METALITE SURFACES

Jesse A. Marable, Jacksonville, Fla.

Application April 29, 1954, Serial No. 426,610

5 Claims. (Cl. 90—12)

(Granted under Title 35, U. S. Code (1952), sec. 266)

The invention described herein may be manufactured and used by or for the Government of the United States of America for governmental purposes without the payment of any royalties thereon or therefor.

The present invention relates to an internal skin and core cutter for metalite surfaces and more particularly to an internal skin and core cutter for metalite surfaces which is operable from above.

In the repair of hollow structures made of metalite, such as aircraft wings or tail surfaces, the defective portion is first cut out, the inner metal skin and balsa core are removed from an area surrounding the hole, and a filler plate inserted in the hole and undercut area surrounding it. Heretofore it has been the practice to cut the inner metal skin by hand, using a scribe, and then scrape away the core. This operation was tedious and time consuming; inaccurate because the work was hidden from the workman; and dangerous because of the sharp edges of the metal skin and the scribe. The present invention overcomes the disadvantages of the prior method by providing a power driven tool which is fast, accurate and safe to operate.

An object of the present invention is the provision of an internal skin and core cutter for metalite surfaces which is operable from above the surface.

Another object is the provision of an internal skin and core cutter for metalite surfaces which is adjustable to handle surfaces of various thicknesses.

A further object is the provision of a power driven internal skin and core cutter for metalite surfaces with an adjustment for varying the depth of cut.

Other objects and many of the attendant advantages of this invention will be readily appreciated as the same becomes better understood by reference to the following detailed description when considered in connection with the accompanying drawings wherein.

Figure 1:
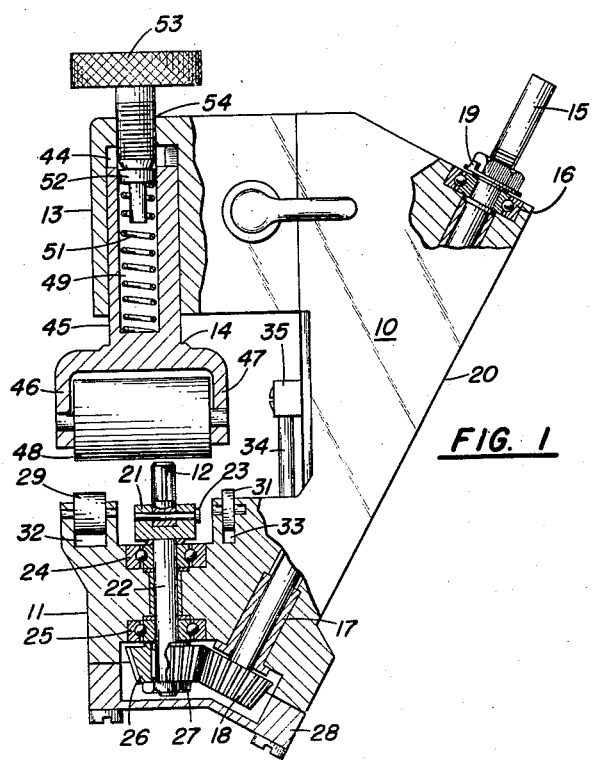
Fig. 1 is an elevation view, partly in section of a cutting tool according to the present invention.

Referring more particularly to Fig. 1 of the drawing, the housing 10 has a body portion 20 integral with a lower jaw portion 11 in which is mounted an end mill cutter 12, and an individual upper jaw portion 13 which carries a roller assembly 14. A drive shaft 15, rotatably mounted in the body portion by means of bearing 16 and bushing 17, has a bevel gear 18 at its lower extremity and is held in position by a nut and lock washer assembly 19 at its upper end. The end mill cutter 12 is mounted on the upper end of shaft 22 such as by collar 21 and pin 23. The shaft 22, rotatably mounted in the lower jaw 11 by means of bearings 24 and 25, has a bevel gear 26 at its lower end meshed with bevel gear 18 and held in place by nut 27. A cap portion 28 at the bottom of housing 10 encloses the gears 18 and 26. Two horizontal rollers 29 and 31 are mounted adjacent the cutter 12 in the grooves 32 and 33 as shown, and a vertical roller 34 is mounted on body portion 20 in the plane of the cutter 12 between the lower jaw 11 and stud 35.

Figure 2:
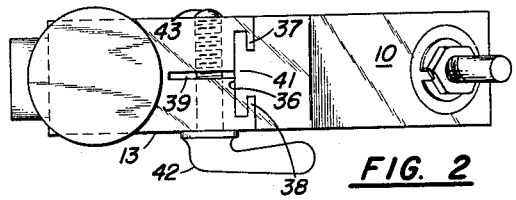
Fig. 2 is a plan view of the tool of Fig. 1.

As shown in Fig. 2, the upper jaw portion 13 is provided at its inner edge with a slot 39 opening into a groove 36 defined by inwardly extending edges 37 and 38. An elongated, undercut key 41 on body portion 20 is received in the groove 36 and serves as a rail upon which the upper jaw 13 slides. A wing bolt 42 has a shank 43 which is passed through one side of the upper jaw, across the slot 39, and threadedly received in the other side of the jaw to clamp the sides of the groove 36 and the edges 37 and 38 against the key 41 to position the upper jaw relative to the lower jaw.

Referring again to Fig. 1, a bore 44 opens onto the lower surface of the upper jaw and slidably receives the shank 45 of the roller assembly 14, the lower portion of which is bifurcated forming legs 46 and 47 between which transverse roller 48 is rotatably mounted. The shank 45 has a longitudinally extending bore 49 in which is positioned compression spring 51. A load-transmitting cap 52 is positioned on the upper end of spring 51 while the lower end of the spring bears against the bottom of the bore 49. A knurled thumbscrew 53 is threaded into hole 54 in the upper surface of the upper jaw and bears against cap 52.

Figure 3:
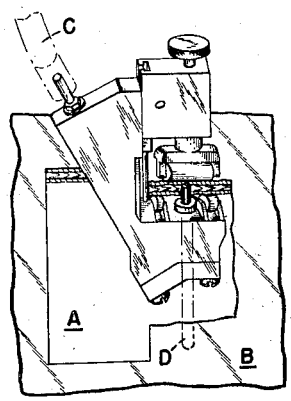
Fig. 3 is a perspective view of the tool in operation.

In the operation of the present invention, see Fig. 3, a hole A is cut in the metalite surface B and the defective portion of the surface removed. A suitable power source, such as a small motor or an air or electric drill, is connected to shaft 15 by a flexible drive shaft C. The upper jaw is clamped on the key 41 the desired distance above the lower jaw and the tool is positioned on the metalite surface with the roller 34 bearing against an edge of the hole A and the roller 48 in contact with the outer skin of the surface. Power is then applied to the tool through drive shafts C, 15 and 22 causing end mill cutter 12 to rotate. The thumbscrew 53 is then tightened, compressing spring 51 causing the lower jaw to move upwardly and feeding the cutter 12 into the interior skin and core. By adjustment of thumbscrew 53, the cutter is fed into the surface to the proper depth. The use of spring 51 enables the cutter to feed itself into the surface without constant adjustment of the thumbscrew since the lower jaw will be forced upward until the spring is expanded. When the cutter is at the proper depth, the tool is guided around the edges of hole A cutting a groove D in the interior skin and core. The groove D is maintained at a constant depth and at a constant distance from the edges of hole A by keeping the rollers 48 and 34 in contact with the outer skin and the edges of the hole respectively. The material between the groove and the edges of the hole A is removed as desired and the area is ready to be patched.

The rollers 29 and 31, the end mill cutter 12, and the rollers 48 and 34 should all be mounted in the same vertical plane to ensure accurate cutting and to maintain the tool in an erect position during operation. For maximum efficiency, the drive shaft 15 should be positioned at an angle of 25 to 35 degrees relative to shaft 22.

Obviously, many modifications and variations of the present invention are possible in the light of the above teachings. It is therefore to be understood, that within the scope of the appended claims, the invention may be practiced otherwise than as specifically described.

What I claim is:

1. An interior skin and core cutter for undercutting the periphery of a hole within the surface area of a hollow structure, said cutter comprising a tapered housing, the narrow portion of said housing being adapted to be inserted into a hole within said surface area of said hollow structure, said housing having a lower jaw and an upper jaw in vertical spaced alignment; a vertical, upwardly disposed end mill cutter rotatably mounted in said lower jaw and extending into the space between said jaws; means operatively connected to said cutter for driving the same; and said cutter adapted to undercut a groove around said periphery of said hole within said surface area of said hollow structure.

2. The interior skin and core cutter of claim 1, and a roller mounted on the upper jaw to rotate about a horizontal axis extending transversely of the cutter; means connected to said housing and said roller for adjustably mounting said roller to move in a vertical direction towards or away from the end of said cutter, said roller adapted to roll on the surface of said hollow structure.

3. An internal skin and core cutter for cutting a groove about the periphery of a hole in metalite surfaces comprising a tapered body portion, a lower jaw integral with the narrow end of said tapered body portion for insertion into said hole, and an upper jaw spaced in vertical alignment above said lower jaw and movably mounted on said body portion; a vertically, upwardly disposed end mill cutter rotatably mounted in said lower jaw and extending into the space between said jaws; drive means operatively connected to said cutter; and a roller assembly mounted in said upper jaw, said assembly including a vertically disposed shank received within a bore in the upper jaw, a roller mounted on the lower end of said shank and rotatable about a horizontal axis extending transversely of the vertical axis of said cutter, and means for adjusting said shank and roller with respect to said upper jaw.

4. An internal skin and core cutter for metalite surfaces as defined in claim 3, further characterized by a second roller mounted on said body portion between the upper and lower jaws parallel to said cutter.

5. An internal skin and core cutter for metalite surfaces as defined in claim 3, further characterized in that said adjusting means includes a thumb-screw threaded in said upper jaw and bearing against a compression spring positioned within a bore in said shank.

References Cited in the file of this patent.

UNITED STATES PATENTS

| | | |
|---|---|---|
| 1,415,048 | Patigian | May 9, 1922 |
| 1,657,659 | Carter | Jan. 31, 1928 |
| 1,744,875 | Edwards | Jan. 28, 1930 |
| 1,934,729 | Monckmeier | Nov. 14, 1933 |
| 2,140,120 | Tomarin | Dec. 13, 1938 |
| 2,216,108 | Brockway | Oct. 1, 1940 |
| 2,311,215 | Duffy | Feb. 16, 1943 |
| 2,348,406 | Ogren | May 9, 1944 |
| 2,466,045 | Schuler | Apr. 5, 1949 |
| 2,688,348 | Sullivan | Sept. 7, 1954 |
| 2,697,965 | Armitage | Dec. 28, 1954 |

FOREIGN PATENTS

| | | |
|---|---|---|
| 404,107 | Germany | Oct. 15, 1924 |
| 826,350 | Germany | Jan. 3, 1952 |